(12) United States Patent
Foufa et al.

(10) Patent No.: US 12,028,176 B2
(45) Date of Patent: Jul. 2, 2024

(54) MACHINE-LEARNING-MODEL BASED NAME PRONUNCIATION

(71) Applicant: Microsoft Technology Licensing, LLC, Redmond, WA (US)

(72) Inventors: Mastafa Hamza Foufa, Nimes (FR); Romain Gabriel Paul Rey, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 17/359,070

(22) Filed: Jun. 25, 2021

(65) Prior Publication Data

US 2022/0417047 A1    Dec. 29, 2022

(51) Int. Cl.
*H04L 12/18*    (2006.01)
*G06N 20/00*    (2019.01)
*G10L 15/06*    (2013.01)

(52) U.S. Cl.
CPC ......... *H04L 12/1818* (2013.01); *G06N 20/00* (2019.01); *G10L 15/063* (2013.01); *H04L 12/1822* (2013.01); *G10L 2015/0638* (2013.01)

(58) Field of Classification Search
None
See application file for complete search history.

(56) References Cited

U.S. PATENT DOCUMENTS 7,467,087 B1 * 12/2008 Gillick ................. G10L 15/26
704/235
8,781,841 B1 * 7/2014 Wang ..................... H04M 3/56
704/275

(Continued)

FOREIGN PATENT DOCUMENTS

CN    109830226 A    5/2019
KR    102222597 B1    3/2021

OTHER PUBLICATIONS

"How Do I Add a Pronunciation Guide to My Name on Facebook?", Retrieved from: https://en-gb.facebook.com/help/1532835720321216, Apr. 27, 2020, 1 Page.

(Continued)

*Primary Examiner* — Jonathan C Kim
(74) *Attorney, Agent, or Firm* — Alleman Hall & Tuttle LLP

(57) ABSTRACT

A computer-implemented conferencing method is disclosed. A conference session between a user and one or more other conference participants is initiated via a computer conference application. An attribute-specific pronunciation of the user's name is determined via one or more attribute-specific-pronunciation machine-learning models previously trained based at least on one or more attributes of the one or more other conference participants. The attribute-specific pronunciation of the user's name is compared to a preferred pronunciation of the user's name via computer-pronunciation-comparison logic. Based on the attribute-specific pronunciation of the user's name being inconsistent with the preferred pronunciation of the user's name, a pronunciation learning protocol is automatically executed to convey, via the computer conference application, the preferred pronunciation of the user's name to the one or more other conference participants.

19 Claims, 7 Drawing Sheets

(56) References Cited

U.S. PATENT DOCUMENTS

| | | | | |
|---|---|---|---|---|
| 9,620,104 | B2* | 4/2017 | Naik | G10L 13/027 |
| 9,747,891 | B1* | 8/2017 | Abuelsaad | G10L 25/51 |
| 10,061,855 | B2 | 8/2018 | Waibel et al. | |
| 10,152,965 | B2 | 12/2018 | Bruguier et al. | |
| 11,605,384 | B1* | 3/2023 | Dalton | G10L 15/08 |
| 2007/0055523 | A1* | 3/2007 | Yang | G09B 19/06 |
| | | | | 704/E21.019 |
| 2008/0208574 | A1* | 8/2008 | Chen | G10L 13/08 |
| | | | | 704/221 |
| 2013/0158984 | A1* | 6/2013 | Myslinski | G06Q 50/01 |
| | | | | 704/9 |
| 2013/0197902 | A1* | 8/2013 | Nazarian | G10L 21/00 |
| | | | | 704/201 |
| 2014/0086395 | A1* | 3/2014 | Redfern | G10L 17/22 |
| | | | | 704/E11.001 |
| 2014/0214426 | A1* | 7/2014 | Kanevsky | G10L 15/08 |
| | | | | 704/251 |
| 2014/0365216 | A1* | 12/2014 | Gruber | G10L 13/027 |
| | | | | 704/235 |
| 2015/0058005 | A1* | 2/2015 | Khare | G10L 15/063 |
| | | | | 704/235 |
| 2016/0004748 | A1* | 1/2016 | Botchen | H04L 67/04 |
| | | | | 709/204 |
| 2016/0188727 | A1* | 6/2016 | Waibel | G06F 16/9535 |
| | | | | 707/758 |
| 2016/0336008 | A1* | 11/2016 | Menezes | G06F 40/295 |
| 2018/0190262 | A1* | 7/2018 | Lewis | H04L 67/54 |
| 2019/0073994 | A1 | 3/2019 | Parthasarathy et al. | |
| 2021/0350784 | A1* | 11/2021 | Selvaggi | G10L 13/047 |
| 2022/0012420 | A1* | 1/2022 | Henderson | G09B 5/06 |
| 2022/0165251 | A1* | 5/2022 | Virupaksha | G06F 16/686 |
| 2022/0284882 | A1* | 9/2022 | Peddinti | G10L 13/08 |
| 2022/0382907 | A1* | 12/2022 | Siohan | G10L 17/02 |
| 2022/0417047 | A1* | 12/2022 | Foufa | G06N 20/00 |
| 2023/0005487 | A1* | 1/2023 | Emmanuel | H04L 65/403 |
| 2023/0138820 | A1* | 5/2023 | Bohra | H04M 3/563 |
| | | | | 704/258 |
| 2023/0154498 | A1* | 5/2023 | Adams Ryan | H04N 21/4728 |
| | | | | 386/282 |
| 2023/0162731 | A1* | 5/2023 | Wu | G10L 15/187 |
| | | | | 704/275 |
| 2023/0325590 | A1* | 10/2023 | Shevchenko | G06N 5/04 |
| | | | | 715/200 |

OTHER PUBLICATIONS

"How to Add Name Pronunciation to Your Linkedin Profile", Retrieved from: https://www.linkedin.com/pulse/how-add-name-pronunciation-your-linkedin-profile-david-petherick/, Jul. 1, 2020, 4 Pages.

"International Search Report and Written Opinion Issued in PCT Application No. PCT/US22/029521", dated Aug. 29, 2022, 9 Pages.

* cited by examiner

MACHINE-LEARNING-MODEL BASED NAME PRONUNCIATION

BACKGROUND

Due to advances in computer technology, human interactions that once existed only in-person now can be conducted virtually using computers. For example, meetings, educational classes, conversations, and chats all may be conducted virtually using computer conference applications that provide audio/video conferencing, capabilities. Further, such computer-based virtual interactions allow for people with different cultural backgrounds to interact with one another. For example, people from different geographic regions that natively speak different languages all around the world may virtually interact with one another. With such diversification of people interacting with one another comes a corresponding diversification of people's names. In many cases, a person having one type of cultural background (e.g., originating from one geographic region) may struggle to correctly pronounce the name of another person having a different cultural background (e.g., originating from a different geographic region). Such struggles with name pronunciation can negatively affect virtual interactions and result in conference participants not feeling confident about speaking the names of other conference participants.

SUMMARY

A computer-implemented conferencing method is disclosed. A conference session between a user and one or more other conference participants is initiated via a computer conference application. An attribute-specific pronunciation of the user's name is determined via one or more attribute-specific-pronunciation machine-learning models previously trained based at least on one or more attributes of the one or more other conference participants. The attribute-specific pronunciation of the user's name is compared to a preferred pronunciation of the user's name via computer-pronunciation-comparison logic. Based on the attribute-specific pronunciation of the user's name being inconsistent with the preferred pronunciation of the user's name, a pronunciation learning protocol is automatically executed to convey, via the computer conference application, the preferred pronunciation of the user's name to the one or more other conference participants.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
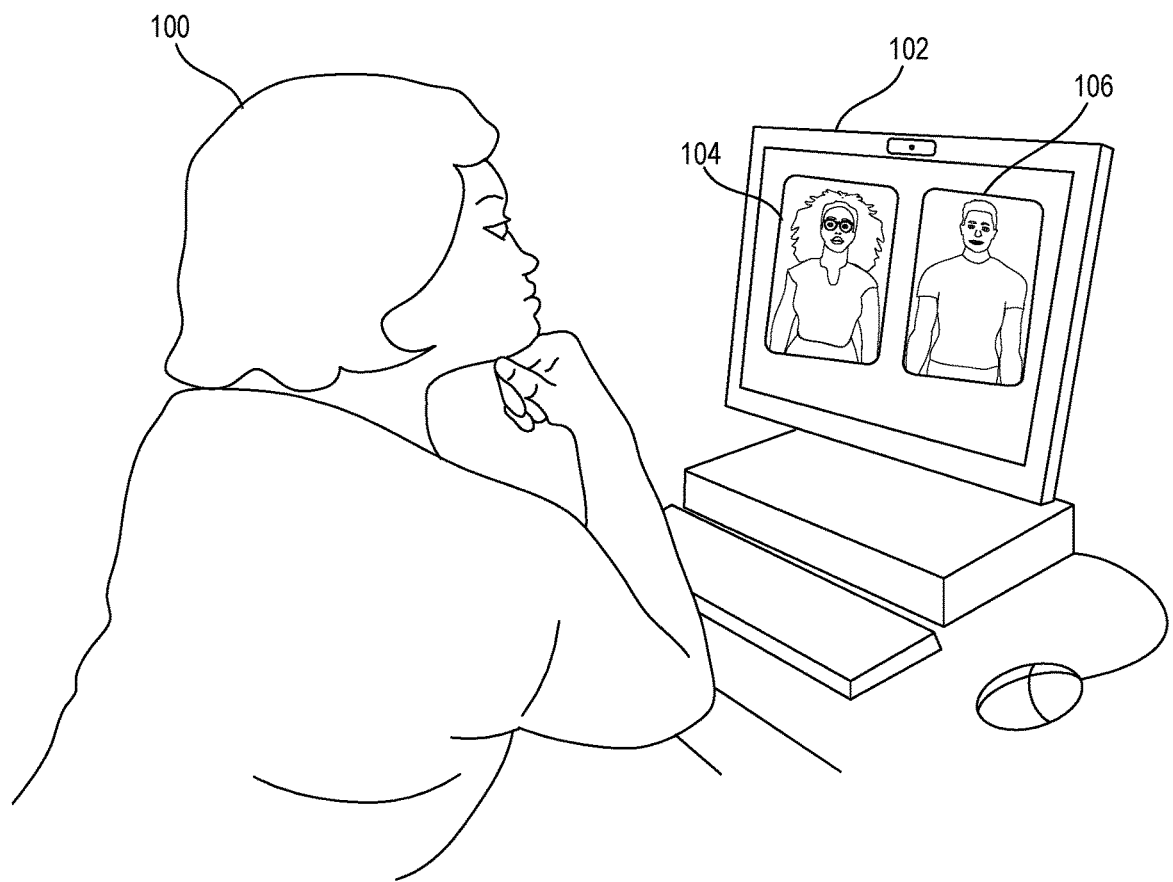
FIG. 1 shows an example scenario where a user is interacting with other conference participants via a computer conferencing application executed by a computing system.

The present description is directed to an approach for conveying a preferred pronunciation of a user's name to other conference participants. The herein-described name pronunciation learning approach may leverage different machine-learning models to provide different name pronunciation learning functionality. As one example, the approach leverages a preferred-pronunciation machine-learning model that is configured to determine a likely preferred pronunciation of a user's name in cases where the user has not provided a preferred pronunciation themself. The preferred-pronunciation machine-learning model may be previously trained based at least on pronunciations of the user's name by people from a geographic region from which the user originates (and natively speaks the same language). As used herein, the term "region" may include any suitable geographic location that encompasses a group of users having a common language, dialect, and/or other speech patterns that influence a pronunciation of a user's name. Non-limiting examples of such geographic regions may include neighborhoods, cities, states, provinces, and countries. The preferred-pronunciation machine-learning model provides the capability of being able to suggest to the other conference participants how to pronounce the user's name with relatively high confidence without needing to explicitly ask the user for the preferred pronunciation of the user's name.

Further, as another example, the approach leverages one or more attribute-specific-pronunciation machine-learning models that are configured to determine an attribute-specific pronunciation of the user's name. The one or more attribute-specific-pronunciation machine-learning models may be previously trained based at least on one or more attributes of the other conference participants. As one example, the one or more different attributes may include a geographic region from which other conference participants originate. In this example, the attribute-specific-pronunciation machine-learning model(s) are trained on training data associated with people that originate from the geographic region from which the other conference participants originate. The attribute-specific-pronunciation machine-learning model(s) provides the capability of being able to suggest to the user how the other conference participants are likely to pronounce the user's name.

Using these machine-learning models and/or a user-provided preferred pronunciation, the attribute-specific pronunciation of the user's name can be compared to the preferred pronunciation of the user's name via computer-pronunciation-comparison logic. Based on the attribute-specific pronunciation of the user's name being inconsistent with the preferred pronunciation of the user's name, a pronunciation learning protocol is automatically executed to convey the preferred pronunciation of the user's name to the one or more other conference participants. The same approach may be applied to each user that is included in the virtual interaction. As such, each user may learn how to properly pronounce each other conference participant's name instead of having to explicitly ask the other conference participants how to pronounce their names. Accordingly, struggles with name pronunciation can be avoided and virtual interactions with other people may be improved.

FIG. 1 shows an example scenario where a user 100 is virtually interacting with other conference participants (i.e., different users) via a computer conference application executed by a user computer 102. For example, the first user 100, a second user 104, and a third user 106 may be work colleagues that originate from different geographic regions around the world. 'Mary'—the first user 100 originates from Seattle in the United States. 'Louise'—the second user 104 originates from Paris in France. 'Sean'—the third user 106 originates from Dublin in Ireland. For each user, a preferred pronunciation of the user's name typically depends on the geographic region from which the user originates. Further, a perceived pronunciation of a user's name by other conference participants typically depends on the geographic region from which the other conference participants originate. Since the conference participants originate from different geographic regions that have different native languages, in some cases, the conference participants may struggle to properly pronounce the names of the other conference participants. For example, Mary may be unsure whether Louise is pronounced 'LOO-EES' or 'LOW-IS.' Further, Mary may be unsure whether Sean is pronounced 'SEE-N' or 'SHO-N.'

Figure 2:
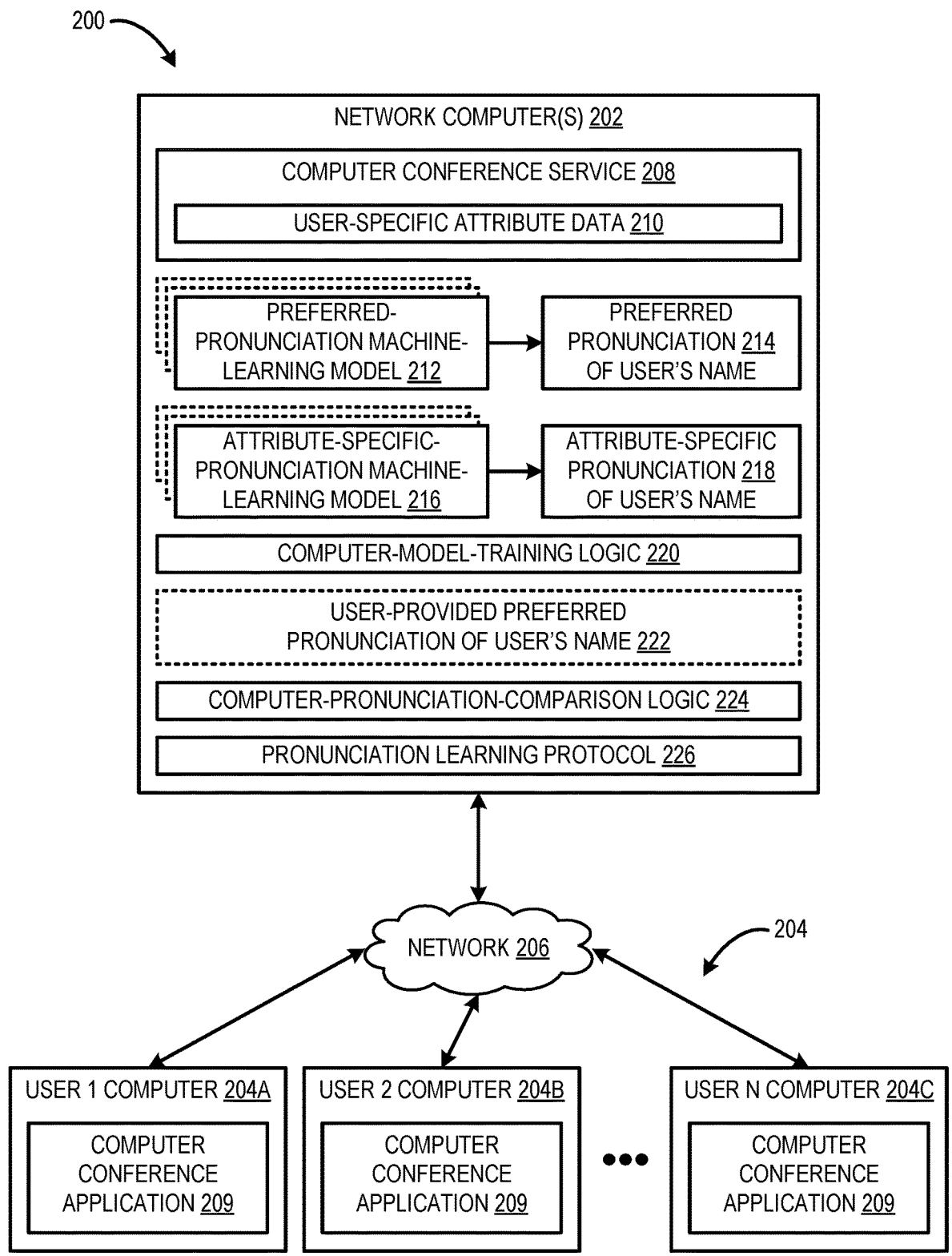
FIG. 2 shows an example computing system that is configured to automatically convey a preferred pronunciation of a user's name to other conference participants via a computer conferencing application.

In order to clear up such name pronunciation confusion, the user computer 102 and/or cooperating network computers of a computing system 200 (shown in FIG. 2) may be configured to automatically execute a pronunciation learning protocol to convey the preferred pronunciations of the different user's names to the other conference participants.

The computing system 200 includes one or more network computers 202 communicatively coupled with a plurality of different user computers 204 (e.g., first user computer 204A, second user computer 204B, Nth user computer 204C) via a computer network 206. The different user computers 204 are associated with different users. For example, the first user computer 204A may correspond to the user computer 102 associated with the first user 100, the second user computer 204B may be associated with the second user 104, and the Nth user computer 204C may be associated with the third user 106 shown in FIG. 1 and discussed above. In some examples, multiple user computers may be associated with the same user and user-specific interactions may be tracked across all user computers associated with a particular user. Any suitable number of user computers may be communicatively coupled with the network computer(s) 202. The computing system 200 includes the network computer(s) 202 and the plurality of user computers 204.

The network computer(s) 202 are configured to execute a computer conference service 208, and the plurality of user computers 204 are configured to execute a computer conference application 209. In some examples, the computer conference service 208 and the computer conference application 209 are configured to work in conjunction to initiate conference sessions between different users such that the different users may virtually interact with each other via the computer conference application 209. The computer conference service 208 and/or the computer conference application 209 are configured to provide audio/video capabilities. In some examples, a conference session may include just audio capabilities akin to a "conference phone call." In other examples, a conference session may include audio and video capabilities akin to a "conference video call." Other conference experiences may optionally be included, such as virtual reality conference experiences, whiteboard conference experiences, text chat conference experiences, etc.

The computer conference service 208 and/or the computer conference application 209 are configured to generate user-specific attribute data 210 based on personal information of each user as well as user-specific interactions between a user and one or more other users while using the computer conference application 208. The user-specific attribute data 210 for each user of the computer conference application 209 may be tracked and stored in the network computer(s) 202 and/or the user computers 204. For example, user-specific attribute data 210 for a user may be saved as part of a user profile that may be maintained across multiple conference sessions and other virtual interactions. The user-specific attribute data 210 may be aggregated for a user over multiple different virtual interactions with different users via the computer conference service 208, the computer conference application 209, and/or other applications and/or computing services. Further, the computer conference service 208 and/or the computer conference application 209 may be configured to obtain user-specific attribute data 210 in other manners, such as explicitly requesting the user-specific attribute data 210 from the user and/or inferring the user-specific attribute data 210 based on user actions. The user-specific attribute data 210 may be obtained for a user in any suitable manner.

The user-specific attribute data 210 may include any suitable type of data that may be used to characterize an attribute of a user in terms of natural language processing and more particularly name pronunciation. Non-limiting examples of attributes that may characterize different users include geographic region from which the user originates, geographic region in which the user resides, geographic region in which the user works or goes to school, native language spoken by the user, alternative languages spoken by the user, social network graph of other users with which the user interacts, age, occupation, area of study in school.

As one example, the computer conference service 208 and/or the computer conference application 208 is configured to generate user-specific attribute data 210 by recognizing and recording a conversation between a user and other participants of a conference session. The computer conference service 208 and/or the computer conference application 208 are configured to attribute different conversation snippets to the different users, so that words that are spoken during the conversation are recognized, attributed, and stored as user specific attribute data 210. Further, the user-specific attribute data 210 may be derived from such processed conversations. In some cases, the user specific attribute data 210 may be tagged with keyword tags that further characterize the particular user-specific interactions. Note that "tagging" is one example of determining user-specific attribute data 210. The computing system 200 may be configured to determine user-specific attribute data 210 corresponding to different users using any suitable classification technique. The user-specific attribute data 210 may be used to train and/or reinforce different name-pronunciation machine-learning models.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

The computing system 200 is configured to execute two different types of name-pronunciation machine-learning models that employ a similar architecture but are trained using different training data such that the different types of name-pronunciation machine-learning models infer a pronunciation of a user's name differently. A preferred-pronunciation machine-learning model 212 is configured to determine a preferred pronunciation 214 of a user's name based on how other people having one or more attributes in common with the user would pronounce the user's name. The preferred pronunciation 214 of the user's name determined by the preferred-pronunciation machine-learning model 212 allows other conference participants to learn how the user would likely prefer their name to be pronounced. Note that the computing system 200 may be configured to train and execute different instances of the preferred-pronunciation machine-learning model 212 for different users (or for multiple users having the same name with the same preferred pronunciation).

Further, one or more attribute-specific-pronunciation machine-learning models 216 are configured to determine an attribute-specific pronunciation 218 of a user's name that allows the user to know how one or more other conference participants are likely to pronounce the user's name. In this case, the other conference participants are characterized or grouped in terms of one or more attributes, hence the pronunciation 218 of the user's name by these conference participant(s) is referred to as being "attribute-specific."

Figure 3:
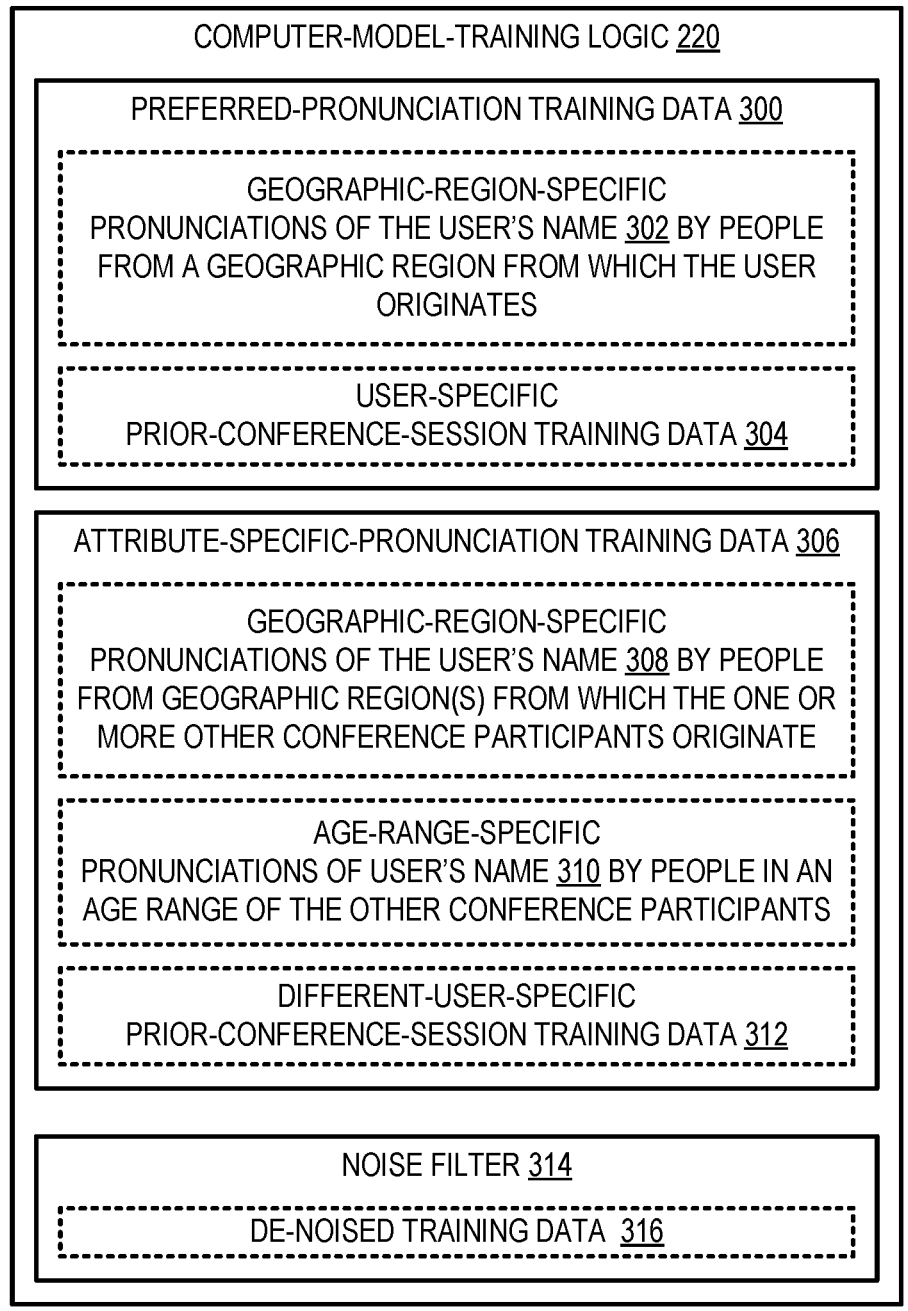
FIG. 3 shows example computer-model-training logic that is configured to train name-pronunciation machine-learning models.

The computing system 200 is configured to execute computer-model-training logic 220 that is configured to train the preferred-pronunciation machine-learning model 212 and the attribute-specific-pronunciation machine-learning model(s) 216. The computer-model-training logic 220 is shown in more detail in FIG. 3.

The computer-model-training logic 220 is configured to obtain preferred-pronunciation training data 300 to train the preferred-pronunciation machine-learning model 212. In some examples, the preferred-pronunciation training data 300 may include audio snippets, phonetic spelling, or other forms of pronunciations of the user's name.

In some implementations, the preferred-pronunciation training data 300 includes pronunciations 302 of the user's name by people from a geographic region from which the user originates. The geographic region from which the user originates may be determined using various techniques. In one example, the geographic region from which the user originates can be inferred by the spelling of the user's name. In another example, the geographic region from which the user originates can be inferred based on a detected most common language spoken by the user during virtual interactions via the computer conference application 208. In yet another example, the geographic region from which the user originates can be specified by the user via user input. For example, the geographic region from which the user originates can be saved in a user profile for the user and may be included in the user-specific attribute data 210 of the user.

Referring to the example discussed above with reference to FIG. 1, since Mary originates from Seattle, the instance of the preferred-pronunciation machine-learning model corresponding to Mary may be trained using preferred-pronunciation training data that includes pronunciations of 'Mary' by people that also originate from Seattle (or a larger region encompassing Seattle, such as Washington State). Further, since Louise originates from Paris, the instance of the preferred-pronunciation machine-learning model corresponding to Louise may be trained using preferred-pronunciation training data that includes pronunciations of 'Louise' by people that also originate from Paris (or a larger region encompassing Paris, such as Ile-de-France). Further still, since Sean originates from Dublin, the instance of the preferred-pronunciation machine-learning model corresponding to Sean may be trained using preferred-pronunciation training data that includes pronunciations of 'Sean' by people that also originate from Dublin (or a larger region encompassing Dublin, such as Leinster).

In some implementations, the computer-model-training logic 220 is configured to obtain training data 306 from conference sessions conducted prior to training of the preferred-pronunciation machine-learning model 212. For example, training data 306 may include pronunciations of the user's name by conference participants that originate from the same geographic region as the user that are spoken by those different conference participants during prior conference sessions.

In some implementations, annotators may supply at least some of the preferred-pronunciation training data 300. For example, annotators may provide pronunciations of names in an appropriately-unambiguous format (e.g., a phonetic spelling of the user's name).

The computer-model-training logic 220 is configured to obtain attribute-specific pronunciation training data 306 to train the one or more attribute-specific-pronunciation machine-learning models 216. In some examples, the attribute-specific-pronunciation training data 306 may include audio snippets, phonetic spelling, or other forms of pronunciations of the user's name.

In some implementations, annotators may supply at least some of the attribute-specific-pronunciation training data 306. For example, annotators may provide pronunciations of names in an appropriately-unambiguous format (e.g., a phonetic spelling of the user's name).

In some implementations, the computer-model-training logic 220 is configured to train an attribute-specific-pronunciation machine-learning model based at least on one or more common attributes of the other conference participants that are virtually interacting with the user via the computer conference application 208. In one example, the attribute(s)

include a geographic region of origin of the other conference participants, and the computer-model-training logic 220 is configured to train an attribute-specific-pronunciation machine-learning model based on pronunciations of the user's name 308 by people that originate from the geographic region of the other conference participants. In one example, Sean originates from Dublin, Ireland and works for a company in Hong Kong. Sean's work colleagues originate from Hong Kong and reside in Hong Kong. Sean virtually interacts with the work colleagues via the computer conference application 208. In this example, the computer-model-training logic 220 is configured to train an attribute-specific-pronunciation machine-learning model based on pronunciations of 'Sean' by people that originate from Hong Kong. The computer-model-training logic 220 may be configured to train an attribute-specific-pronunciation machine-learning model based at least on pronunciations of a user's name by other people from any suitable geographic region.

In another example, the attribute includes an age range of the other conference participants, and the computer-model-training logic 220 is configured to train an attribute-specific-pronunciation machine-learning model based on pronunciations 310 of the user's name by people in that age range. In one example, Mary's work colleagues that virtually interact with Mary via the computer conference application 208 are over 50 years old. In this example, the computer-model-training logic 220 is configured to train an attribute-specific-pronunciation machine-learning model based on pronunciations of 'Mary' by people that are older than 50. The computer-model-training logic 220 may be configured to train an attribute-specific-pronunciation machine-learning model based at least on pronunciations of a user's name by other people in any suitable age range.

In yet another example, each attribute may be encoded as a parameter for a different dimension of a vector, and other conference participants may be represented by different vectors of attributes. In this example, a plurality of different attribute-specific machine-learning models may be trained based on different vectors of attributes. In this example, the computer-model-training logic 220 may be configured to train the different attribute-specific-pronunciation machine-learning models based on pronunciations of the user's name by people having a same set of common attributes corresponding to the different vectors. In some examples, the computing system 200 may be configured to select an attribute-specific machine-learning model having a closest geometric similarity based on a vector comparison. In one example, Louise's work colleagues that virtually interact with Louise via the computer conference application 208 share the common attributes of being between 30 and 40 years old, originating from Dublin, Ireland, and have Business degrees. In this example, the computer-model-training logic 220 is configured to train an attribute-specific-pronunciation machine-learning model based on pronunciations of 'Louise' by people that also are between 30 and 40 years old, originate from Dublin, Ireland, and have Business degrees. The computer-model-training logic 220 may be configured to train an attribute-specific-pronunciation machine-learning model based at least on pronunciations of a user's name by other people having any suitable set of common attributes.

In some implementations, the computer-model-training logic 220 is configured to train different attribute-specific-pronunciation machine-learning models for each of the other conference participants that virtually interact with the user via the computer conference application 208 based at least on one or more attributes of each of the other conference participants. Referring back to the example discussed above with reference to FIG. 1, the computer-model-training logic 220 may be configured to train a first attribute-specific-pronunciation machine-learning model based at least on pronunciations of 'Mary' by people having one or more common attributes with Louise. Further, the computer-model-training logic 220 may be configured to train a second attribute-specific-pronunciation machine-learning model based at least on pronunciations of 'Mary' by people having one or more common attributes with Sean. In this example, the first and second models may be used to determine attribute-specific pronunciations of 'Mary' by the other conference participants. The computer-model-training logic 220 may be configured to train any suitable number of different attribute-specific-pronunciation machine-learning models for any suitable number of other conference participants that virtually interact with the user via the computer conference application 208.

In some implementations, the computer-model-training logic 220 is configured to obtain training data 312 from conference sessions conducted prior to training of the one or more attribute-specific-pronunciation machine-learning model 216. For example, training data 312 may include pronunciations of the user's name by people having the same attribute(s) as the other conference participants (e.g., that originate from the same geographic region as the other conference participants) that are spoken by those people during prior conference sessions.

In some implementations, the computer-model-training logic 220 includes a noise filter 314 that is configured to filter patterns of users speaking during prior conference sessions to remove any background or other noise to provide de-noised training data 316 that includes filtered pronunciations of different user's names that may be used for training of the preferred-pronunciation machine-learning model 212 and/or the one or more attribute-specific-pronunciation machine-learning models 216.

Note that the computer-model-training logic 220 trains the preferred-pronunciation machine-learning model 212 and the one or more attribute-specific-pronunciation machine-learning models 216 prior to use/execution of these machine-learning models, hence these machine-learning models are referred to as being "previously trained."

Returning to FIG. 2, the computing system 200 is configured to initiate a conference session between a user and one or more other conference participants via the computer conference application 209 so that the user and the one or more other conference participants may virtually interact with each other. In some examples, instances of the computer conference application 209 executed on different user computers 204 may initiate a conference session with each other via the computer conference service 208. In some examples, different instances of the computer conference application 209 executed on different user computers 204 may be configured to initiate a conference session on a peer-to-peer basis. In such peer-to-peer implementations, at least some to all of the functionality of the network computer(s) 202 may be distributed across some to all of the user computers 204 associated with participants of the conference session.

In some examples, initiating the conference session may include scheduling the conference session. In other examples, initiating the conference session may include creating audio/video streams between the user and the one or more other conference participants.

In implementations in which there are multiple different attribute-specific-pronunciation machine-learning models 216, the computing system 200 may be configured to select one or more appropriate attribute-specific-pronunciation machine-learning models based on one or more attributes of the other conference participants (e.g., select an attribute-specific machine-learning model having a closest geometric similarity based on a vector comparison of vectors of the other conference participants). The computing system 200 is configured to determine an attribute-specific pronunciation 218 of the user's name via the selected attribute-specific-pronunciation machine-learning model(s) 216.

Further, in some cases, the computing system 200 optionally may have received a user-provided preferred pronunciation 222 of the user's name from the user prior to the conference session being initiated. In some examples, the user-provided preferred pronunciation 222 of the user's name may have been previously received by the computing system 200 via user input from the user. In other examples, the user-provided preferred pronunciation 222 of the user's name may have been detected by the computing system 200 as being spoken by the user during one or more different conference sessions that occurred prior to the current conference session.

If the computing system 200 has not received the user-provided preferred pronunciation 222 of the user's name, the computing system 200 may be configured to determine the preferred pronunciation 214 of the user's name via the preferred-pronunciation machine-learning model 212. The model-determined preferred pronunciation 214 of the user's name may still provide an inference with relatively high confidence even though the user has not explicitly provided the preferred pronunciation of the user's name.

The computing system 200 includes computer-pronunciation-comparison logic 224 that is configured to compare the attribute-specific pronunciation 218 of the user's name to the preferred pronunciation 214/222 of the user's name to determine if the attribute-specific pronunciation 218 of the user's name is consistent with the preferred pronunciation 214/222 of the user's name. In some examples, the two pronunciations may be determined to be consistent if the two pronunciations match exactly. In other examples, the two pronunciations may be determined to be consistent if the two pronunciations differ within a threshold tolerance.

In some examples, based on the attribute-specific pronunciation 214 of the user's name being consistent with the preferred pronunciation 214/222 of the user's name, the computing system 200 may be configured to convey, via the computer conference service 208 and/or the computer conference application 209, a consistent-pronunciation notification to the user and/or the other conference participants. The consistent-pronunciation notification may indicate that the other conference participants are likely to pronounce the user's name correctly. In other examples, based on the attribute-specific pronunciation 214 of the user's name being consistent with the preferred pronunciation 214/222 of the user's name, the computing system 200 may be configured to provide no further name-pronunciation-based actions to indicate that the two pronunciations are consistent.

Further, based on the attribute-specific pronunciation 218 of the user's name being inconsistent with the preferred pronunciation 214/222 of the user's name, the computing system 200 may be configured to automatically execute a pronunciation learning protocol 226 to convey, via the computer conference service 208 and/or the computer conference application 209, the preferred pronunciation 214/222 of the user's name to the one or more other conference participants.

Figure 4:
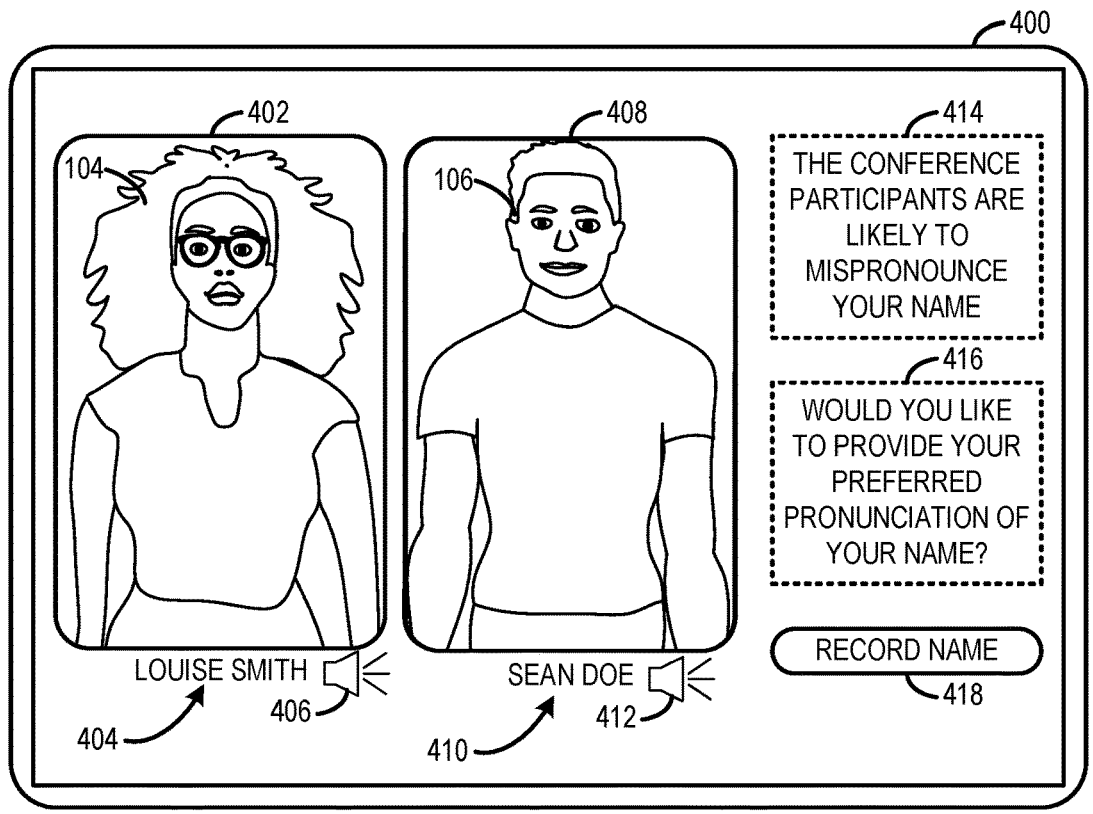
FIGS. 4 and 5 show aspects of an example pronunciation learning protocol that may be automatically executed to convey a preferred pronunciation of a user's name to other conference participants via a computer conference application.
Figure 5:
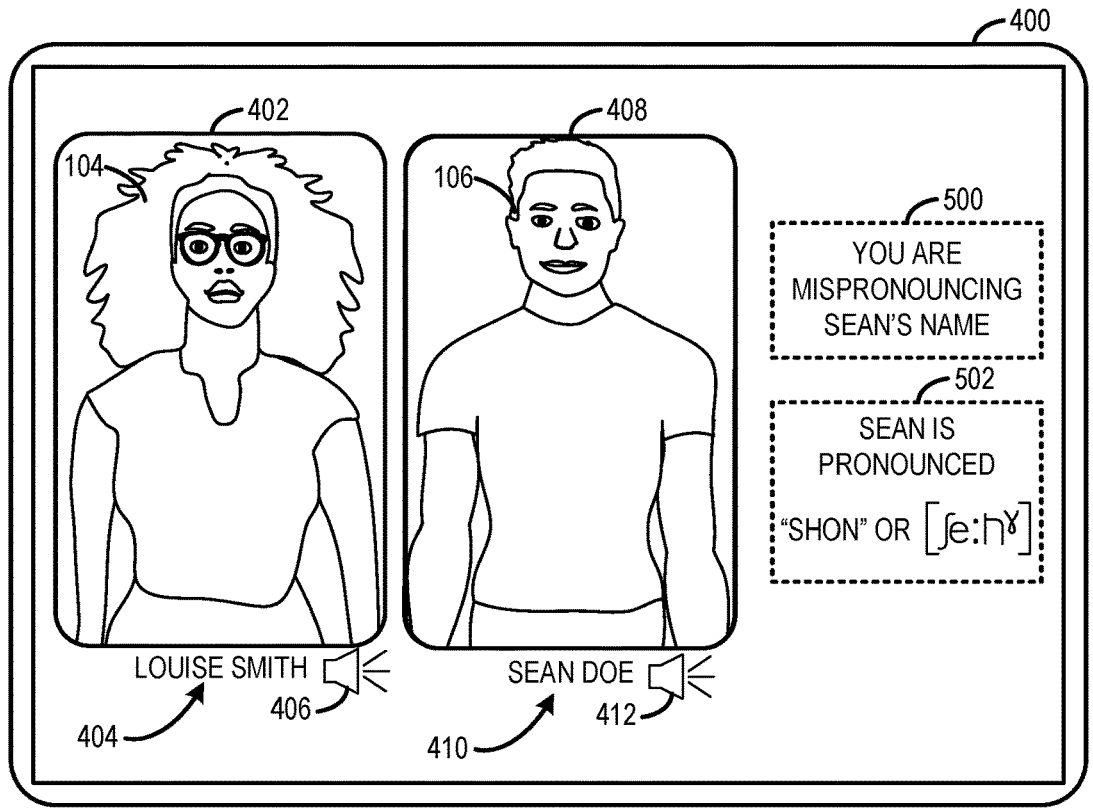

FIGS. 4 and 5 show aspects of an example pronunciation learning protocol that may be automatically executed to convey a preferred pronunciation of a user's name to one or more other conference participants via a computer conference application. In particular, FIGS. 4 and 5 show an example graphical user interface (GUI) 400 representing a conference session initiated by the computer conference service 208 and/or the computer conference application 209 shown in FIG. 2. The GUI 400 corresponds to the perspective of the first user 100 shown in FIG. 1. The GUI 400 includes a video representation 402 of the second user 104 shown in FIG. 1, a label 404 indicating the second user's name, and a pronunciation button 406. Based on the pronunciation button 406 being selected by the first user, an audio snippet of the preferred pronunciation of the second user's name is audibly presented to the first user without being audibly presented to other conference participants. In some examples, the audio snippet may include a recording of the second user speaking their own name. In other examples, the audio snippet may include a computer-generated simulation of the preferred pronunciation of the second user's name. In still other examples, the pronunciation button 406 may be omitted if the second user has not provided a recording of the second user pronouncing their own name.

Similarly, the GUI 400 includes a video representation 408 of the third user 106 shown in FIG. 1, a label 410 indicating the third user's name, and a pronunciation button 412. Based on the pronunciation button 412 being selected by the first user, an audio snippet of the preferred pronunciation of the third user's name is audibly presented to the first user without being audibly presented to the other conference participants. In some examples, the audio snippet may include a recording of the third user speaking their own name. In other examples, the audio snippet may include a computer-generated simulation of the preferred pronunciation of the third user's name. In still other examples, the pronunciation button 412 may be omitted if the third user has not provided a recording of the third user pronouncing their own name.

The GUI 400 may be configured to provide various name-pronunciation-based actions as part of the pronunciation learning protocol that help the first user learn the preferred pronunciations of the names of the other conference participants and vice versa. In one example shown in FIG. 4, based on the attribute-specific pronunciation 218 of the user's name being inconsistent with the preferred pronunciation 214/222 of the user's name, a notification 414 is conveyed to the user. The notification 414 indicates that the other conference participants (i.e., the second and third users 104, 106) are likely to mispronounce the user's name. The notification 414 may encourage the first user to provide the preferred pronunciation of the first user's name to the second and third users 104, 106 directly during the virtual interaction. For example, the first user may say, "Hello my name is Mary." Accordingly, the other conference participants may learn the preferred pronunciation directly from the first user without incurring any awkward name mispronunciation issues. Further, in some examples, the notification 414 may be presented in corresponding GUIs of user computers associated with the second and third users 104, 106, such that the second and third users 104, 106 may avoid mispronouncing the first user's name.

In examples where the first user has not yet provided a preferred pronunciation of the user's name, the pronunciation learning protocol may include presenting a prompt 416 to the first user requesting that the first user provide a user-provided preferred pronunciation of the user's name. Further, the GUI 400 may include a record button 418. The first user may select the record button 418 to record an audio snippet of the first user speaking their own name. The recorded audio snippet may be presented to a different user without being presented to other conference participants based on the different user selecting a pronunciation button associated with the first user in a corresponding GUI presented by a user computer associated with the different user similar to the pronunciation buttons 406, 412.

In some examples, the pronunciation learning protocol 226 may include intervention actions that may be triggered based on a user mispronouncing another user's name. In one example, as shown in FIG. 5, during the conference session, the computing system 200 may detect, via the computer-pronunciation-comparison logic 224, that the first user is mispronouncing the second user's name. Based on detecting the mispronunciation, the pronunciation learning protocol 226 may include visually presenting a mispronunciation notification 500 in the GUI 400 to notify the first user that they are mispronouncing the third user's name privately without presenting the mispronunciation notification 500 to other conference participants. Alternatively or additionally, the mispronunciation notification may be audibly presented in private to only the first user and not the second and third users.

In some examples, the pronunciation learning protocol 226 may include visually presenting a preferred-pronunciation notification 502 in the GUI 400. The preferred-pronunciation notification 502 may include a phonetic spelling of the user's name. Alternatively or additionally, the preferred-pronunciation notification may be audibly presented only to the first user and not the second and third users. In this case, an audio snippet of the preferred pronunciation of the third user's name may be audibly presented to the first user. In some examples, for each conference participant an instance of the preferred-pronunciation notification 502 may be automatically presented to inform the first user of the phonetic spelling of the names of each other conference participants.

The pronunciation learning protocol 226 may include any suitable name-pronunciation-based actions that help the other conference participants learn the preferred pronunciation of the user's name and vice versa.

Machine-learning-model-based name pronunciation inferences and associated name pronunciation learning protocols have been discussed in the context of virtual interactions via a computer conference application and/or a computer conference service. However, these concepts are broadly applicable to any suitable computer application. Other computer applications that may employ such concepts include, but are not limited to, computer social networking applications, computer occupation applications, and computer educational applications. Accordingly, such machine-learning-model-based name pronunciation inferences and associated name pronunciation learning protocols can be leveraged by any platform for improving virtual interactions between different users.

Figure 6:
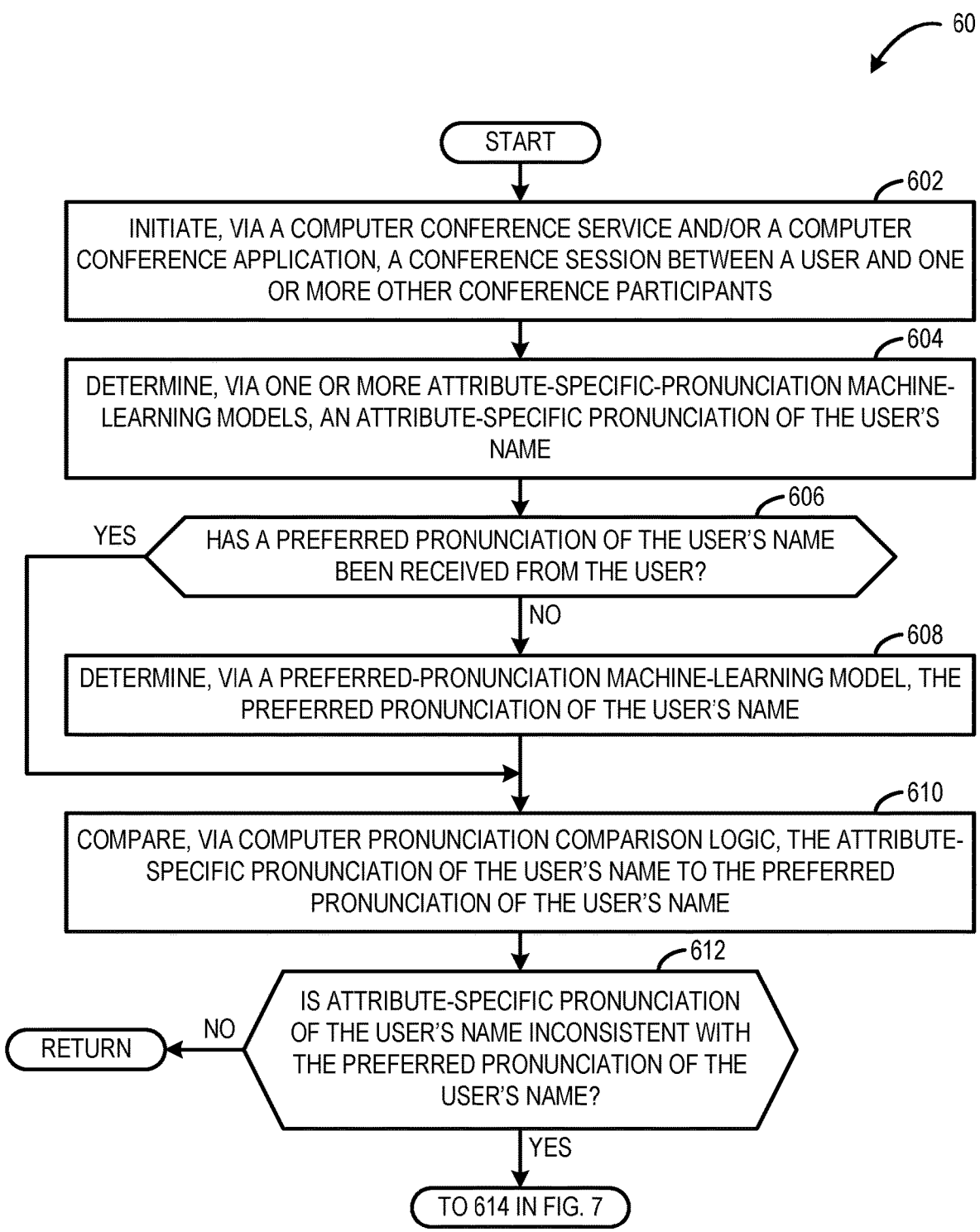
FIGS. 6 and 7 show an example computer-implemented conferencing method.
Figure 7:
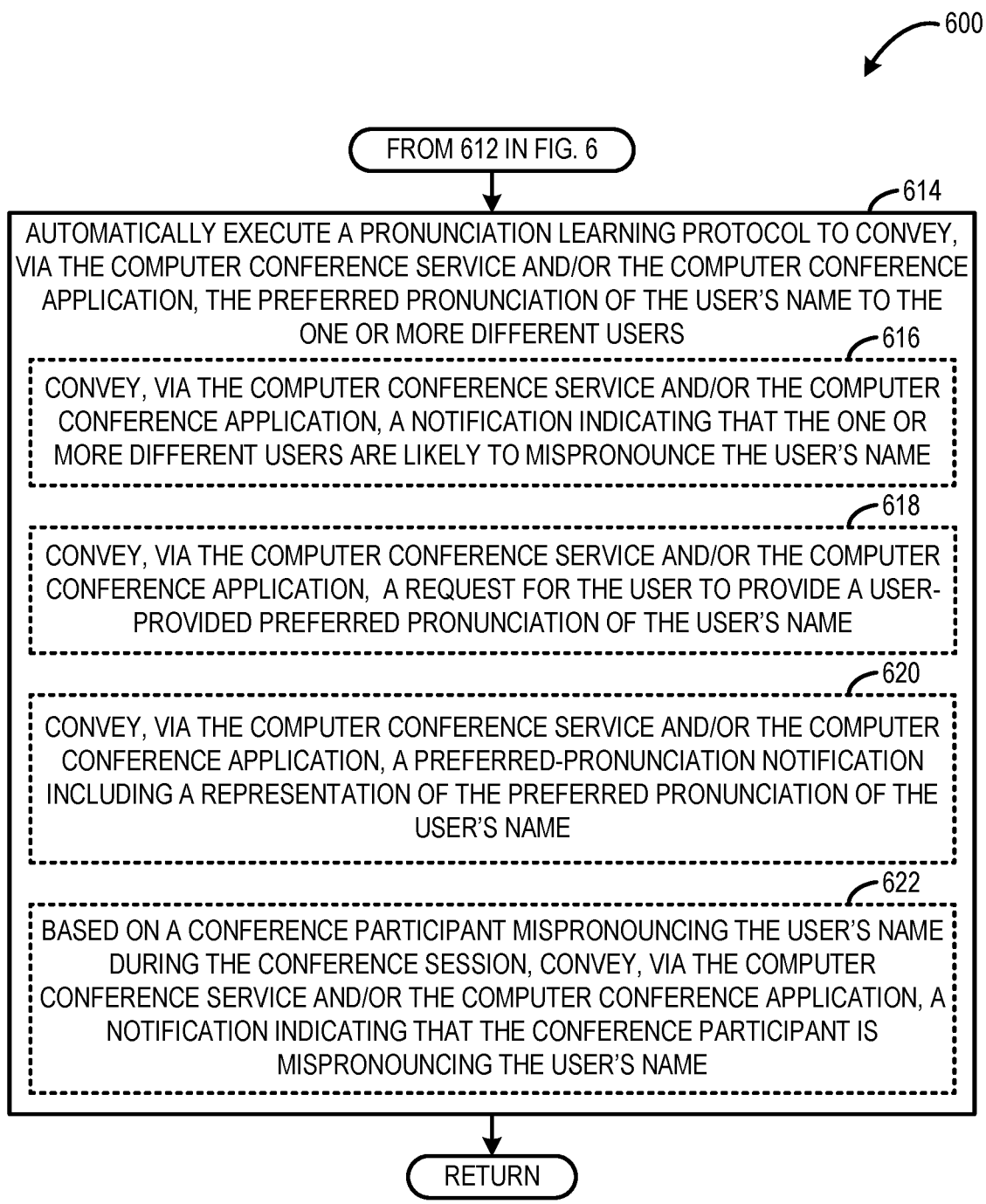

FIGS. 6 and 7 show an example computer-implemented conferencing method 600. For example, the computer-implemented conferencing method may be performed by the computing system 200 shown in FIG. 2 including one or more of the network computer(s) 202 and/or any of the plurality of user computers 204.

At 602, the method 600 includes initiating, via a computer conference application and/or a computer conference service, a conference session between a user and one or more other conference participants. For example, the computer conference service may correspond to the computer conference service 208 and the computer conference application may correspond to the computer conference application 209 shown in FIG. 2.

At 604, the method 600 includes determining, via one or more attribute-specific-pronunciation machine-learning models, an attribute-specific pronunciation of the user's name. For example, the one or more attribute-specific-pronunciation machine-learning models may correspond to the one or more attribute-specific-pronunciation machine-learning models 216 shown in FIG. 2. In some examples, one or more attribute-specific-pronunciation machine-learning models are previously trained based at least on one or more attributes of the one or more other conference participants. In some examples, a single attribute-specific-pronunciation machine-learning model previously trained based at least on common attributes of the other conference participants may be used to determine the attribute-specific pronunciation of the user's name. In other examples, different attribute-specific-pronunciation machine-learning models corresponding to individual conference participants previously trained based on different attributes of the different conference participants may be used to determine the attribute-specific pronunciation of the user's name.

At 606, the method 600 includes determining if a preferred pronunciation of the user's name has been received from the user. In some examples, the preferred pronunciation of the user's name may be received directly from the user via user input. In other examples, the preferred pronunciation of the user's name may be received by detecting that the user has spoken their own name during one or more prior conference sessions. If the preferred pronunciation of the user's name has been received, then the method 600 moves to 610. Otherwise, the preferred pronunciation of the user's name has not been received, and the method moves to 608.

At 608, the method 600 includes determining, via a preferred-pronunciation machine-learning model, the preferred pronunciation of the user's name. For example, the preferred-pronunciation machine-learning model may correspond to the preferred-pronunciation machine-learning model 212 shown in FIG. 2. In some examples, the preferred-pronunciation machine-learning model may be previously trained based at least on pronunciations of the user's name by people from a geographic region from which the user originates.

At 610, the method 600 includes comparing, via computer-pronunciation-comparison logic, the attribute-specific pronunciation of the user's name to the preferred pronunciation of the user's name. For example, the computer-pronunciation-comparison logic may correspond to the computer-pronunciation-comparison logic 224 shown in FIG. 2. If the user-provided preferred pronunciation of the user's name has been received, then the user-provided preferred pronunciation of the user's name may be compared to the attribute-specific pronunciation of the user's name. Otherwise, if the user-provided preferred pronunciation of the user's name has not been received, then the model-determined provided preferred pronunciation may be compared to the attribute-specific pronunciation of the user's name. If the attribute-specific pronunciation of the user's name is inconsistent with the preferred pronunciation of the user's name, then the method 600 moves to 614 in FIG. 7. Otherwise, the attribute-specific pronunciation of the user's name is consistent with the preferred pronunciation of the user's name and the method 600 returns to other operations.

In FIG. 7, at 614, the method 600 includes automatically executing a pronunciation learning protocol to convey, via the computer conference service and/or the computer conference application, the preferred pronunciation of the user's name to the one or more other conference participants.

In some implementations, at 616, the method 600 optionally may include, as part of the pronunciation learning protocol, conveying via the computer conference service and/or the computer conference application, a notification indicating that the one or more other conference participants are likely to mispronounce the user's name. In some examples, the notification may be conveyed to the user so that the user is encouraged to provide the user's preferred pronunciation directly to the other conference participants during the virtual interaction. In some examples, the notification may be conveyed to the other conference participants so that the other conference participants may avoid mispronouncing the user's name during the virtual interaction.

In some implementations, at 618, the method 600 optionally may include, as part of the pronunciation learning protocol, conveying, via the computer conference service and/or the computer conferencing application, a request for the user to provide a user-provided preferred pronunciation of the user's name.

In some implementations, at 620, the method 600 optionally may include, as part of the pronunciation learning protocol, conveying, via the computer conference service and/or the computer conferencing application, a preferred-pronunciation notification including a representation of the preferred pronunciation of the user's name. In some examples, the representation of the preferred pronunciation of the user's name may include a recorded audio snippet of the user speaking their own name. In other examples, the representation of the preferred pronunciation of the user's name may include a computer-simulated audio snippet audibly presenting the preferred pronunciation. In still other examples, the representation of the preferred pronunciation of the user's name may include a phonetic spelling of the user's name.

In some implementations, at 622, the method 600 optionally may include, as part of the pronunciation learning protocol, detecting that a conference participant mispronounces the user's name during the conference session, and based on said detecting, conveying, via the computer conference service and/or the computer conferencing application, a mispronunciation notification indicating that the conference participant is mispronouncing the user's name. The mispronunciation notification may be conveyed to the conference participant privately without the mispronunciation notification being conveyed to other conference participants. The mispronunciation notification may alert the conference participant of the mispronunciation of the user's name so that the conference participant can make corrections going forward.

The above-described method may be performed from the perspective of each of the users included in the conference session, so that each user may learn the preferred-pronunciation of each other user's name.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
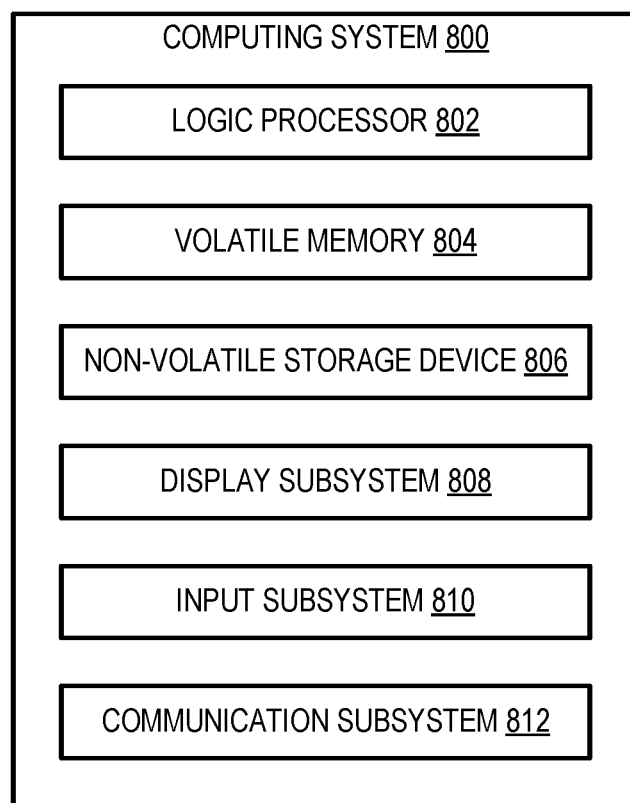
FIG. 8 shows an example computing system.

FIG. 8 schematically shows a non-limiting implementation of a computing system 800 that can enact one or more of the methods and processes described above. Computing system 800 is shown in simplified form. Computing system 800 may embody the computing system 200 including the network computer(s) 202 and the plurality of user computers 204 described above and illustrated in FIG. 2. Further, the computing system 800 may embody the including the user computer 102 shown in FIG. 1. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches, backpack host computers, and head-mounted augmented/mixed virtual reality devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 800 typically implemented by a processor to perform a particular function using portions of volatile memory, which function involves transformative processing that specially configures the processor to perform the function. Thus, a module may be instantiated via logic processor 802 executing instructions held by non-volatile storage device 806, using portions of volatile memory 804. It will be understood that different modules may be instantiated from the same application, service, code block, object, library, routine, API, function, pipeline, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc.

Any of the name-pronunciation machine-learning analysis described above may be implemented using any suitable combination of state-of-the-art and/or future machine learning (ML), artificial intelligence (AI), and/or other natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example:

deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems can and may be continually monitored to identify potential bias, errors, and/or unintended outcomes.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, microphone for speech and/or voice recognition, a camera (e.g., a webcam), or game controller.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 800 to send and/or receive messages to and/or from other devices via a network such as the Internet.

In an example, a computer-implemented conferencing method comprises initiating, via a computer conference application, a conference session between a user and one or more other conference participants; determining, via one or more attribute-specific-pronunciation machine-learning models previously trained based at least on one or more attributes of the one or more other conference participants, an attribute-specific pronunciation of the user's name, comparing, via computer-pronunciation-comparison logic, the attribute-specific pronunciation of the user's name to a preferred pronunciation of the user's name, and based on the attribute-specific pronunciation of the user's name being inconsistent with the preferred pronunciation of the user's name, automatically executing a pronunciation learning protocol to convey, via the computer conference application, the preferred pronunciation of the user's name to the one or more other conference participants. In this example and/or other examples, the computer-implemented conferencing method may further comprise determining, via a preferred-pronunciation machine-learning model, the preferred pronunciation of the user's name. In this example and/or other examples, the preferred-pronunciation machine-learning model may be previously trained based at least on pronunciations of the user's name by people from a geographic region from which the user originates. In this example and/or other examples, the computer-implemented conferencing method may further comprise detecting that the user pronounced the user's name during one or more different conference sessions that occurred prior to the conference session, and determining the preferred pronunciation of the user's name based on a detected prior pronunciation of the user's name by the user during the one or more different conference sessions. In this example and/or other examples, the computer-implemented conferencing method may further comprise receiving the preferred pronunciation of the user's name via user input from the user. In this example and/or other examples, the pronunciation learning protocol may include conveying, via the computer conference application, a notification to at least one of the user and the one or more other conference participants, the notification indicating that the one or more other conference participants are likely to mispronounce the user's name. In this example and/or other examples, the pronunciation learning protocol may include conveying, via the computer conference application, a notification to the one or more other conference participants, the notification including a representation of the preferred pronunciation of the user's name. In this example and/or other examples, the pronunciation learning protocol may include, based on the user not having previously provided a user-provided preferred pronunciation of the user's name, presenting a prompt to the user requesting that the user provide the user-provided preferred pronunciation of the user's name. In this example and/or other examples, the one or more attributes may include a geographic region from which the one or more other conference participants originate, and the one or more attribute-specific-pronunciation machine-learning models may be previously trained based at least on pronunciations of the user's name by people from the geographic region from which the one or more other conference participants originate. In this example and/or other examples, the one or more attributes may include an age range of the one or more other conference participants and the one or more attribute-specific-pronunciation machine-learning models may be previously trained based at least on pronunciations of the user's name by people in the age range of the one or more other conference participants. In this example and/or other examples, the one or more other conference participants may include a plurality of other conference participants, and the one or more attribute-specific-pronunciation machine-learning models may be previously trained based at least on one or more common attributes shared by the plurality of other conference participants. In this example and/or other examples, the one or more other conference participants may include a plurality of other conference participants, and the one or more attribute-specific-pronunciation machine-learning models may include a plurality of attribute-specific-pronunciation machine-learning models each previously trained based at least on one or more attributes of a corresponding participant of the plurality of other conference participants. In this example and/or other examples, the computer-implemented conferencing method may further comprise detecting that the one or more other conference participants pronounced the user's name during one or more different conference sessions that occurred prior to the conference session, and the one or more attribute-specific-pronunciation machine-learning models may be previously trained based at least on pronunciations of the user's name by the one or more other conference participants during the one or more different conference sessions.

In another example, a computing system comprises a logic processor, and a storage device holding instructions executable by the logic processor to initiate, via a computer conference application, a conference session between a user and one or more other conference participants, determine, via one or more attribute-specific-pronunciation machine-learning models previously trained based at least on one or more attributes of the one or more other conference participants, an attribute-specific pronunciation of the user's name, compare, via computer-pronunciation-comparison logic, the attribute-specific pronunciation of the user's name to a preferred pronunciation of the user's name, and based on the attribute-specific pronunciation of the user's name being inconsistent with the preferred pronunciation of the user's name, automatically execute a pronunciation learning protocol to convey, via the computer conference application, the preferred pronunciation of the user's name to the one or more other conference participants. In this example and/or other examples, the pronunciation learning protocol may include conveying, via the computer conference application, a notification to at least one of the user and the one or more other conference participants, the notification indicating that the one or more other conference participants are likely to mispronounce the user's name. In this example and/or other examples, the pronunciation learning protocol may include conveying, via the computer conference application, a notification to the one or more other conference participants, the notification including a representation of the preferred pronunciation of the user's name. In this example and/or other examples, the pronunciation learning protocol may include, based on the user not having previously provided a user-provided preferred pronunciation of the user's name, presenting a prompt to the user requesting that the user provide the user-provided preferred pronunciation of the user's name. In this example and/or other examples, the one or more attributes may include a geographic region from which the one or more other conference participants originate, and the one or more attribute-specific-pronunciation machine-learning models may be previously trained based at least on pronunciations of the user's name by people from the geographic region from which the one or more other conference participants originate. In this example and/or other examples, the one or more attributes may include an age range of the one or more other conference participants and the one or more attribute-specific-pronunciation machine-learning models may be previously trained based at least on pronunciations of the user's name by people in the age range of the one or more other conference participants.

In yet another example, a computer-implemented method comprises initiating, via a computer conference application, a conference session between a user and one or more other conference participants, determining, via a preferred-pronunciation machine-learning model previously trained based at least on pronunciations of the user's name by one or more people from a geographic region from which the user originates, a preferred pronunciation of the user's name, determining, via one or more attribute-specific-pronunciation machine-learning models previously trained based at least on one or more attributes of the one or more other conference participants, an attribute-specific pronunciation of the user's name, comparing, via computer-pronunciation-comparison logic, the attribute-specific pronunciation of the user's name to the preferred pronunciation of the user's name, and based on the attribute-specific pronunciation of the user's name being inconsistent with the preferred pronunciation of the user's name, automatically executing a pronunciation learning protocol to convey, via the computer conference application, the preferred pronunciation of the user's name to the one or more other conference participants.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented conferencing method comprising:
   initiating, via a computer conference application, a conference session between a user and a plurality of other conference participants;
   determining, via one or more attribute-specific-pronunciation machine-learning models previously trained based at least on one or more attributes shared by the plurality of other conference participants, an attribute-specific pronunciation of the user's name;
   comparing, via computer-pronunciation-comparison logic, the attribute-specific pronunciation of the user's name to a preferred pronunciation of the user's name; and
   based on the attribute-specific pronunciation of the user's name being inconsistent with the preferred pronunciation of the user's name, automatically executing a pronunciation learning protocol to convey, via the computer conference application, the preferred pronunciation of the user's name to the plurality of other conference participants.

2. The computer-implemented conferencing method of claim 1, further comprising:
   determining, via a preferred-pronunciation machine-learning model, the preferred pronunciation of the user's name.

3. The computer-implemented conferencing method of claim 2, wherein the preferred-pronunciation machine-learning model is previously trained based at least on pronunciations of the user's name by people from a geographic region from which the user originates.

4. The computer-implemented conferencing method of claim 1, further comprising:
   detecting that the user pronounced the user's name during one or more different conference sessions that occurred prior to the conference session; and
   determining the preferred pronunciation of the user's name based on a detected prior pronunciation of the user's name by the user during the one or more different conference sessions.

5. The computer-implemented conferencing method of claim 1, further comprising:
   receiving the preferred pronunciation of the user's name via user input from the user.

6. The computer-implemented conferencing method of claim 1, wherein the pronunciation learning protocol includes conveying, via the computer conference application, a notification to at least one of the user and the plurality of other conference participants, the notification indicating that the plurality of other conference participants are likely to mispronounce the user's name.

7. The computer-implemented conferencing method of claim 1, wherein the pronunciation learning protocol includes conveying, via the computer conference application, a notification to the plurality of other conference participants, the notification including a representation of the preferred pronunciation of the user's name.

8. The computer-implemented conferencing method of claim 1, wherein the pronunciation learning protocol includes, based on the user not having previously provided a user-provided preferred pronunciation of the user's name, presenting a prompt to the user requesting that the user provide the user-provided preferred pronunciation of the user's name.

9. The computer-implemented conferencing method of claim 1, wherein the one or more attributes include a geographic region from which one or more of the plurality of other conference participants originate, and wherein the one or more attribute-specific-pronunciation machine-learning models are previously trained based at least on pronunciations of the user's name by people from the geographic region from which the one or more of the plurality of other conference participants originate.

10. The computer-implemented conferencing method of claim 1, wherein the one or more attributes include an age range of the plurality of other conference participants and wherein the one or more attribute-specific-pronunciation machine-learning models are previously trained based at least on pronunciations of the user's name by people in the age range of the plurality of other conference participants.

11. The computer-implemented conferencing method of claim 1, wherein the one or more attribute-specific-pronunciation machine-learning models include a plurality of attribute-specific-pronunciation machine-learning models each previously trained based at least on one or more attributes of a corresponding participant of the plurality of other conference participants.

12. The computer-implemented conferencing method of claim 1, further comprising:
   detecting that one or more the plurality of other conference participants pronounced the user's name during one or more different conference sessions that occurred prior to the conference session; and
   wherein the one or more attribute-specific-pronunciation machine-learning models are previously trained based at least on pronunciations of the user's name by the one or more of the plurality of other conference participants during the one or more different conference sessions.

13. A computing system comprising:
   a logic processor; and
   a storage device holding instructions executable by the logic processor to:
      initiate, via a computer conference application, a conference session between a user and a plurality of other conference participants;
      determine, via one or more attribute-specific-pronunciation machine-learning models previously trained based at least on one or more attributes shared by the plurality of other conference participants, an attribute-specific pronunciation of the user's name;
      compare, via computer-pronunciation-comparison logic, the attribute-specific pronunciation of the user's name to a preferred pronunciation of the user's name; and
      based on the attribute-specific pronunciation of the user's name being inconsistent with the preferred pronunciation of the user's name, automatically execute a pronunciation learning protocol to convey, via the computer conference application, the preferred pronunciation of the user's name to the plurality of other conference participants.

14. The computing system of claim 13, wherein the pronunciation learning protocol includes conveying, via the computer conference application, a notification to at least one of the user and the plurality of other conference participants, the notification indicating that the plurality of other conference participants are likely to mispronounce the user's name.

15. The computing system of claim 13, wherein the pronunciation learning protocol includes conveying, via the computer conference application, a notification to the plurality of other conference participants, the notification including a representation of the preferred pronunciation of the user's name.

16. The computing system of claim 13, wherein the pronunciation learning protocol includes, based on the user not having previously provided a user-provided preferred pronunciation of the user's name, presenting a prompt to the user requesting that the user provide the user-provided preferred pronunciation of the user's name.

17. The computing system of claim 13, wherein the one or more attributes include a geographic region from which one or more of the plurality of other conference participants originate, and wherein the one or more attribute-specific-pronunciation machine-learning models are previously trained based at least on pronunciations of the user's name by people from the geographic region from which the one or more the plurality of other conference participants originate.

18. The computing system of claim 13, wherein the one or more attributes include an age range of the plurality of other conference participants and wherein the one or more attribute-specific-pronunciation machine-learning models are previously trained based at least on pronunciations of the user's name by people in the age range of the plurality of other conference participants.

19. A computer-implemented method comprising:
- initiating, via a computer conference application, a conference session between a user and a plurality of other conference participants;
- determining, via a preferred-pronunciation machine-learning model previously trained based at least on pronunciations of the user's name by one or more people from a geographic region from which the user originates, a preferred pronunciation of the user's name;
- determining, via one or more attribute-specific-pronunciation machine-learning models previously trained based at least on one or more attributes shared by the plurality of other conference participants, an attribute-specific pronunciation of the user's name;
- comparing, via computer-pronunciation-comparison logic, the attribute-specific pronunciation of the user's name to the preferred pronunciation of the user's name; and
- based on the attribute-specific pronunciation of the user's name being inconsistent with the preferred pronunciation of the user's name, automatically executing a pronunciation learning protocol to convey, via the computer conference application, the preferred pronunciation of the user's name to the plurality of other conference participants.

* * * * *